Patented June 17, 1941

2,245,776

UNITED STATES PATENT OFFICE 2,245,776

CHLOR-ADDITION OF NONTERTIARY OLEFINS

Herbert P. A. Groll, Hamburg, Wellingsbuttel, Germany, and George Hearne, Berkeley, and Donald S. La France, Walnut Creek, Calif., assignors to Shell Development Company, San Francisco, Calif., a corporation of Delaware No Drawing. Application December 8, 1938, Serial No. 244,566

10 Claims. (Cl. 260—662)

This invention relates to the chlorination of non-tertiary olefins and it more particularly relates to the treatment of non-tertiary olefins, or hydrocarbon mixtures comprising one or more of such olefins, with chlorine under such conditions that the non-tertiary olefin or olefins is/are chlorinated via chlor-addition while induced chlorine substitution into saturated compounds present in the reaction system is substantially obviated.

An object of the invention is to provide a practical and economical process for the chlorination of ethylene or secondary olefins to the corresponding saturated olefin dichlorides with substantially no loss of material due to the occurrence of induced substitution of chlorine into the olefin dichloride to result in the formation of undesired higher chlorinated by-products.

Another object of the invention is to provide a practical and economical process for the chlorination of the non-tertiary olefin content of certain hydrocarbon mixtures to the corresponding saturated olefin dichlorides while substantially avoiding induced chlorine substitution into saturated compounds present in the reaction system.

It is known that ethylene can be reacted with chlorine via chlor-addition to form ethylene dichloride, and numerous methods for effecting this apparently simple reaction have been proposed. The chlor-addition reaction, comprising addition of chlorine to the double bond of the olefin to form the saturated olefin dichloride, can be made to go under a variety of conditions and has in itself caused little difficulty. The principal difficulty encountered by prior investigators has been to provide a means of preventing or inhibiting the induced chlorine substitution reaction which takes place concurrently with and at about the same rate as the chlor-addition reaction and results in the formation of excessive amounts of undesired higher chlorinated products, thereby decreasing the yield of the desired olefin dichloride and causing a substantial loss of reactants, particularly the usually more expensive chlorine. This substitutive reaction, which does not occur to any substantial extent with the olefin dichloride in the absence of the olefin, but is induced by the occurrence of the chlor-addition reaction, is termed "induced chlorine substitution."

While the prior investigators found that the chlor-addition reaction could be speeded up by various means, such as operation in the liquid phase, use of catalysts, use of mutual solvents, use of moderately elevated temperatures, etc., they all failed to provide means for inhibiting the induced chlorine substitution reaction when the ethylene itself, or a mixture comprising a practical concentration of it, was reacted with chlorine via chlor-addition. It was found that the chlor-addition reaction can be effected with the reactants in the liquid phase at temperatures as low as $-30°$ C.; however, it has been demonstrated that even at such low temperatures the induced chlorine substitution reaction occurs to a substantial extent. The chlor-addition reaction was found to proceed at a faster rate as the temperature was increased; but, this increase in rate of the desired reaction was accompanied by more induced chlorine substitution. As a result of detailed investigations of the reaction under widely varying conditions, the prior investigators have laid down and demonstrated the rule that, in the chlorination of ethylene, trichlorethane and higher chlorinated products are found in increasing amount as the temperature is increased, and that there is a temperature (about $150°$ C.) at which the induced chlorine substitution reaction becomes the predominant reaction and beyond which it is impracticable to go. Summarizing, one is, from a study of the prior art, led to the conclusion that it is impossible to react a nontertiary olefin per se, or a mixture containing a practicable concentration of such an olefin, with chlorine via chlor-addition under such conditions that no appreciable induced chlorine substitution takes place, and that to obtain an olefin dihalide even fairly free from higher chlorinated products formed by the occurrence of the induced chlorine substitution reaction it is necessary to operate at low temperatures with one or both of the reactants in the liquid phase.

Now, we have, after a detailed and thorough investigation, discovered a method in accordance with which the non-tertiary olefins (ethylene and the secondary olefins), preferably those containing less than six carbon atoms per molecule, or certain hydrocarbon mixtures containing at least one of them in substantial amount, can be treated with chlorine and the non-tertiary olefin or olefins converted to the corresponding olefin dichloride or dichlorides via chlor-addition while the occurrence of induced chlorine substitution into saturated chlorides or hydrocarbons present in the reaction zone is practically completely obviated. Furthermore, our novel process permits the chlor-addition reaction to be effected in the vapor phase, at atmospheric moderately reduced or elevated pressures, and at elevated temperatures at which the desired chlor-addition reaction proceeds at a practicable rate.

Our novel method which permits the chlorination via chlor-addition of non-tertiary olefins under conditions at which induced chlorine substitution into saturated compounds present in the reaction zone is substantially obviated is based on the discovery that the occurrence of the induced substitution reactions can be reduced to practically the vanishing point by operating under such conditions that no liquid phase is present in the reaction zone during the execution of the chlor-addition reaction.

Accordingly, when the object of the invention is to effect the chlorination via chlor-addition of a non-tertiary olefin or a mixture of such olefins in a concentrated state, that is, in the substantial absence of a non-olefinic material, the process is executed by contacting the gaseous olefin and the gaseous chlorine in the desired molecular quantities and in the presence or absence of a chlorination catalyst or surface-active contact material, in a reaction zone maintained throughout at an elevated temperature which is above the dew point of any of the chlorinated products present in the reaction zone under the conditions existing therein but which is below the temperature at which the predominant reaction would be chlor-substitution of the treated non-tertiary olefin or olefins to form unsaturated halides.

In the chlorination via chlor-addition of a pure non-tertiary olefin under the conditions of the known processes, that is, under such conditions of temperature that a liquid phase is present in the reaction zone, the induced chlorine substitution reaction, which comprises reaction of chlorine with the saturated olefin dichloride resulting from the chlor-addition reaction, proceeds concurrently with the chlor-addition reaction and a considerable quantity of undesired higher chlorinated products are formed. In accordance with our invention, which comprises executing the chlor-addition reaction under such conditions that no liquid phase of reactants or chlorinated reaction products is present in the reaction zone, the occurrence of the induced chlorine substitution reaction is substantially obviated while the desired chlor-addition reaction proceeds rapidly and completely to produce only one saturated chlorinated product, namely, the desired olefin dichloride. The process permits chlorination of the lower non-tertiary olefins, that is, those containing no more than five carbon atoms per molecule, with quantitative yields, based on the chlorine reacted, to the corresponding olefin dichlorides.

We have shown in U. S. Patent 2,130,084, that the non-tertiary olefins can be reacted with the halogens at high temperatures and chlorinated via chlor-substitution to the corresponding unsaturated halides. For example, ethylene can be reacted with chlorine while maintaining a minimum temperature of at least 200° C. throughout the reaction zone and be almost quantitatively converted to vinyl chloride. With propylene, the minimum temperature at which the chlor-substitution reaction sets in is about 50° C. lower and the chlor-substitution product is allyl chloride. The "chlor-substitution" reaction with which the above-mentioned patent is concerned is to be distinguished from the entirely different "induced chlorine substitution" reaction which accompanies the chlorination via chlor-addition of the non-tertiary olefins when a liquid phase is present in the reaction zone. The former reaction is not inhibited by oxygen in small amounts, proceeds to a substantial extent only at temperatures greater than 200° C., and is not reduced by eliminating a liquid phase from the reaction zone. The latter or "induced chlorine substitution" reaction can be inhibited by oxygen, proceeds at low temperatures, and does not occur to any appreciable extent in the absence of a liquid phase in the reaction zone. The temperature at which chlor-substitution of the olefins sets in decreases with increasing molecular weight of the olefin. The relation between the induced chlorine substitution reaction and the high temperature chlor-substitution reaction is readily seen by reference to the chlorination of ethylene. When the reactants are contacted in the liquid phase, both chlor-addition to form ethylene dichloride and induced chlorine substitution to form trichlorethane occur and, as long as a liquid phase is present in the reaction zone, the amount of induced chlorine substitution increases as the temperature is raised. If the temperature is raised to the extent that the reaction is in the vapor phase, the induced chlorine substitution decreases as the temperature is decreased and becomes nil when a temperature is reached at which, under the prevailing conditions, there is no liquid phase present in the reaction zone. After this minimum temperature is reached, the temperature can be increased, the induced chlorine substitution remaining nil, until a temperature of about 200° C. is reached, at which temperature the high temperature chlor-substitution reaction begins to occur to result in the formation of vinyl chloride. It is seen from the above that in the execution of our process to obtain the maximum chlor-addition with the minimum of induced chlorine substitution and the minimum of high temperature chlor-substitution, the temperature of operation should be in the range between the temperature at which no liquid phase can be formed in or exist in the reaction zone and the temperature of onset of the high temperature chlor-substitution reaction. If desired, the process can be executed at a temperature above the onset temperature of the chlor-substitution reaction and any desired mixture of the chlor-addition product and the chlor-substitution product obtained. As previously stated, the temperature of onset of the chlor-substitution reaction decreases progressively as the molecular weight of the olefin increases. On the other hand, the temperature at which the reaction zone can be kept free of liquid phase, due to increase in boiling temperature of the chlorinated products, increases as the molecular weight of the olefin increases. It is thus seen that, due to the reduction of the optimum temperature range, as the molecular weight of the treated olefin is increased, a closer control of operating conditions becomes necessary to obtain the product free of unsaturated chlor-substitution products. With the olefins containing more than five carbon atoms, the optimum temperature range becomes so small that it may become impracticable to attempt to obtain the maximum yield of the desired olefin dichloride while preventing the substantial formation of both the induced chlorine substitution reaction and the high temperature chlor-substitution reaction. For this reason, except when it is desired that the olefin dichloride contain a substantial amount of the unsaturated chlor-substitution product, we prefer to treat the non-tertiary olefins containing less than six atoms.

The minimum temperature at which the process can be executed with no liquid phase or liquid film present in the reaction zone is dependent primarily upon the boiling temperature under the pressure existing in the reaction zone, of the chlorinated reaction products formed and upon the ratio of the olefin to the chlorine fed to the reaction zone. If a certain minimum temperature is, for example, established for a given ratio of olefin to chlorine in the feed, increasing the ratio of olefin to chlorine will in general decrease the minimum temperature and permit operation at a lower temperature while still avoiding the deposition of a liquid phase or film in the reaction zone. The particular manner in which the chlor-addition reaction is effected is also a factor affecting the minimum temperature at which the process can be executed without the presence of a liquid phase in the reaction zone. If the gaseous olefin and gaseous chlorine are passed into a reactor which is neither heated nor cooled, the temperature in the reactor may rise considerably above the mixing temperature in some portions of the reaction zone due to the exothermicity of the chlor-addition reaction. Under such conditions, portions of the reaction zone will be below the minimum temperature at which a liquid phase is present therein, and the deposited liquid phase will be carried over into and deposited in the higher temperature portions of the reaction zone and exist therein at a temperature higher than the temperature at which a liquid phase would be deposited if the entire reaction zone were maintained at a constant temperature. Once a liquid film has been deposited on the interior surface of the reaction zone and/or on the surface of any surface active material which may be present therein, it is only removed therefrom extremely slowly, probably because of the formation of higher boiling chlorinated products which require a higher temperature for their removal than is required for removal of the primary chlorinated product.

We prefer to execute the reaction in a reactor provided with suitable heating and/or cooling means such as a constant temperature bath so that the temperature throughout the reaction zone is kept substantially constant above the minimum temperature at which a liquid phase can be deposited or exist in the reaction zone under the prevailing conditions of operation. Obviously, when the pure olefins are chlorinated, the minimum temperature to insure the absence of a liquid phase in the reaction zone increases as the number of carbon atoms in the olefin, and consequently the boiling point of the chlor-addition product, increases. The chlorination of ethylene to ethylene dichloride can be effected and the absence of a liquid phase in the reactor insured by starting with and maintaining throughout the reactor a minimum temperature of about 50° C. or even lower in some cases. In the chlorination of propylene to propylene dichloride, a higher minimum temperature, for example, from about 50° C. to 75° C. may be required. Chlorination of the higher olefins will require still higher minimum temperatures. Using chlorine to ethylene ratios of 1:4–8 and operating with the reaction zone at a constant temperature and in the initial absence of a liquid phase, we have found that ethylene may be chlorinated to ethylene dichloride and deposition of a liquid phase in the reaction zone obviated by operating at a temperature of from about 30° C. to 200° C. When using chlorine to propylene ratios of 1:4–6 and operating in the initial absence of a liquid phase, propylene can be chlorinated to propylene dichloride and the deposition of a liquid phase in the reaction zone prevented by maintaining the reaction zone at a constant minimum temperature of from about 50° C. to 150° C.

The process of the invention can be applied with excellent results to the chlorination via chlor-addition of the non-tertiary olefin content of hydrocarbon mixtures whose lowest saturated chlorinated products normally boil above room temperature. Such mixtures may be obtained from a variety of sources, for example, by the pyrogenesis or cracking of petroleum or petroleum products, and treated to remove therefrom the hydrocarbons, namely, the paraffin hydrocarbon containing less than three carbon atoms, whose lowest saturated chlorinated products boil below room temperature at atmospheric pressure. Such hydrocarbon mixtures or fractions may contain, besides one or more non-tertiary olefins, paraffin hydrocarbons containing less than three carbon atoms, tertiary olefins, cycloparaffins, cyclo-olefins, etc. Typical hydrocarbon mixtures, the non-tertiary olefin content of which may be converted to the corresponding olefin dihalides in accordance with the process of the invention are the commercial propane-propylene, butane-butylene and pentane-amylene fractions.

When a paraffin hydrocarbon-olefin mixture, such as the butane-butylene fraction, is treated with chlorine under such conditions that a liquid phase is present in the reaction zone, the occurrence of the chlor-addition reaction induces chlorine substitution into the olefin dichloride resulting from the chlor-addition to form saturated polychlorinated products, and also induces chlorine substitution into the paraffin hydrocarbon to form saturated monochlorides. The occurrence of both of these induced chlorine substitution reactions is very materially reduced, in accordance with the principle of the invention, by effecting the chlorination in a reaction zone throughout which the minimum temperature is above the temperature at which a liquid phase could be formed or exist therein. If a tertiary olefin is present in the hydrocarbon mixture treated, it will react with chloride via chlor-substitution to form an unsaturated monochloride. This chlor-substitution reaction to form an unsaturated allyl type chloride is clearly distinct from the induced chlorine substitution reaction into the saturated olefin dichloride or paraffin hydrocarbon to form, respectively, saturated polychlorides or saturated monochlorides. The former reaction is not induced by the occurrence of the chlor-addition reaction, nor is its occurrence inhibited by the absence of a liquid phase in the reaction zone. In the case that it is desired that the reaction product be free of unsaturated chlorides resulting from the chlor-substitution of tertiary olefins, the tertiary olefins can easily be removed, via selective absorption, from the paraffin hydrocarbon-olefin mixture prior to its treatment.

As in the treatment of the olefins in the substantial absence of a diluent material, the maximum reaction temperature which may be employed while avoiding the high temperature chlor-substitution of the non-tertiary olefins present in a suitable paraffin hydrocarbon-olefin mixture depends upon the molecular weight of the olefins present. It is usually impracticable to attempt to effect the chlor-addition, while avoiding induced chlorine substitution and allylic chlor-substitution, of the non-tertiary olefin content of hydrocarbon mixtures containing non-tertiary olefins containing more than five carbon atoms per molecule. If desired, the hydrocarbon fractions, such as the propane-propylene, butane-butylene and pentane-amylene fractions, can be treated under such conditions that the non-tertiary olefin content is partially utilized to form olefin dichlorides via chlor-addition and partially utilized to form unsaturated allyl type chlorides via chlor-substitution. For example, a butane-butylene mixture may be treated with chlorine in accordance with the process of the invention and the secondary butylene content thereof chlorinated to butylene dichloride or to a mixture of butylene dichloride and crotyl chloride while induced chlorine substitution into the butylene dichloride or the butane is substantially obviated. It is seen that our process provides a very convenient and economical method for utilizing the butylene content of a butane-butylene fraction. The difficult and costly step of separating the butylenes from the butanes is eliminated, and the butylene content of the mixture is converted to useful products while loss of chlorine by induced chlorine substitution into the butylene dichloride or into butane is negligible. After treatment, the butylene dichloride and/or crotyl chloride are readily separated from the butanes and each other by distillation or other suitable means.

The chlor-addition reaction is exothermic and considerable heat is liberated during the execution. Overheating may be avoided and the temperature kept above the necessary minimum temperature throughout the reaction zone by the use of conventional constant temperature control means, for example, by surrounding the reaction vessel with a constant temperature bath through which a suitable heat-transferring medium is circulated. Temperature control may be facilitated by employment of a relatively large excess of the olefin over the chlorine in the reaction mixture. The reaction may be effected with the olefin or olefins and the chlorine in substantially equimolecular amount, or with either in excess. In general, we prefer to operate with the olefin or olefins, in substantial molecular excess of the chlorine in the material fed to the reaction zone. The unreacted olefin or olefins may be separated from the chlor-addition product or products by distillation or other suitable means and recycled to the reactor or otherwise utilized.

The reaction tube or chamber may be of any suitable material. Suitable materials are, among others, carbon, the Hastelloys, $KA_2$ steel, nickel, quartz, glass and Monel metal.

The process may be executed at any suitable pressure. For example, the process may be executed at atmospheric pressure or at a moderately elevated or reduced pressure. When treating the olefins containing no more than five carbon atoms, we preferably operate at atmospheric or moderately elevated pressures. In some cases, particularly in the treatment of the higher olefins, it may be desirable to operate under a reduced pressure. Decreasing the pressure in the reaction zone increases the vapor pressure of the chlorinated reaction products and decreases the minimum temperature at which the chlor-addition reaction can be effected with no liquid phase present therein. Thus, with the higher olefins, operation under a reduced pressure increases the temperature range within which the process can be executed with no liquid phase present in the reaction zone and with a minimum of chlor-substitution into the olefin to yield unsaturated monochlorides.

We have found that under the conditions of execution of the process, that is, with the absence of a liquid phase or film in the reaction zone, the desired chlor-addition reaction will not take place in the dark or on particularly clean inert surfaces. Therefore we prefer to use light and/or a catalytically active surface. When the reaction is effected in the presence of light, suitable light supplying devices, such as incandescent bulbs, ultra-violet ray lamps, electric arcs, etc., may be provided around a reaction tube or chamber constructed of a material, such as glass or quartz, which permits passage of light through its walls. Suitable surface active materials which may be provided in the reaction zone together with or in lieu of light are, among others, active carbon, graphite chips, the metal halides such as calcium chloride, the tin chlorides, the antimony chlorides, etc.

The optimum space velocity or rate of passage of the reaction mixture through the reaction zone will depend upon the design of the reaction chamber (amount of surface available), upon the particular temperature employed, and upon the mol ratio of the olefin material to chlorine in the feed. In general good results are obtained by employing the maximum flows that can be reacted in a given reactor. Thus, the rate of production with the given equipment is at a maximum and substantially all of the chlorine is reacted per single passage through the reactor.

The source of the treated non-tertiary olefins or suitable hydrocarbon mixtures containing them is immaterial. Small amounts of water, oxygen, hydrogen sulphide and sulphur dioxide appear to have no deleterious influence on the reaction. From the standpoint of economics, it may be desirable to execute the process in the substantial absence of water. In lieu of free chlorine per se, we may employ any of the known free chlorine yielding substances capable of yielding free chlorine, without formation of a liquid phase, under the conditions existing in the reaction zone.

The invention is illustrated by the following representative examples which are presented for illustrative purposes and are not to be regarded as limitative.

*Example I*

Gaseous ethylene and chloride were reacted via chlor-addition in accordance with the process of the invention to form ethylene dichloride. The reaction was effected in a reaction tube having an inside diameter of 1.3 cm. and a length of 45 cm. The reaction tube was packed with granules of calcium chloride (about 44 gm.) and surrounded by a constant temperature bath. The reaction zone was maintained at a constant minimum temperature of 125° C. while gaseous ethylene and gaseous chlorine were passed into it, the flow of each reactant being about 50 cc. per minute. Due to complete absence of a liquid phase in the reaction zone during the reaction, there was no induced chlorine substitution. The only reaction which occurred was addition of chlorine to the double bond of the ethylene to form ethylene dichloride. A total of 74% of the chlorine was reacted on one passage through the reaction zone.

*Example II*

Gaseous ethylene and gaseous chlorine were reacted via chlor-addition, the reaction being effected in a reaction tube having a diameter of 1¾" and a length of 22". The reaction tube was surrounded by an aluminum metal block to which heat was supplied by means of a gas furnace. The reactants were preheated to about the same temperature (200° C.), mixed, and the mixture passed into the heated reaction zone wherein the minimum temperature was equal to at least 198° C. The chlorine feed was about 0.38 gm. per minute, the mol ratio of ethylene to chlorine about 7.7, and the space velocity through the reaction zone about 0.02 per second. On one passage through the reaction zone, about 81% of the chlorine was reacted. There was no induced chlorine substitution; the only reaction which occurred was chlor-addition to form ethylene dichloride.

*Example III*

The reaction was effected in a glass reaction tube having an inside diameter of 0.7 cm. and a length of 51 cm., illuminated during the operation by light from a high intensity mercury vapor lamp. The reaction tube was maintained at a constant temperature of 50° C. while a mixture of gaseous propylene and gaseous chlorine in the approximate mol ratio of 4 to 1 was passed through it at a rate of about 500 cc. per minute. On one passage through the reaction tube, 81.2% of the applied chlorine reacted to form propylene dichloride. No induced chlorine substitution took place.

The run was repeated at a constant temperature of 150° C., other conditions being the same. Less chlorine reacted per single passage through the reaction but, as before, no induced chlorine substitution took place.

With a constant temperature of 50° C. in the reaction zone, and operating under the influence of light with a mol ratio of propylene to chlorine of only 2 to 1, a total of 99.7% of the chlorine reacted on one passage through the tube; however, 14.3% of the chlorine reacted via induced chlorine substitution into the propylene dichloride to form higher chlorinated products. The relatively large amount of induced chlorine substitution occurred because a liquid phase was present in the reaction zone. The results of this run, as compared with the results of the run made under the same conditions with a propylene-chlorine mol ratio of 4, show the marked influence of the presence of a liquid phase on the course of the reaction, and show that the minimum temperature at which the olefin can be reacted with chlorine via chlor-addition with no liquid phase present in the reaction zone depends to a certain extent upon the ratio of olefin to chlorine in the feed, the minimum temperature decreasing as the ratio is increased.

*Example IV*

A butane-butylene mixture was treated with chlorine to effect the chlorination via chlor-addition of the butylene content of the mixture. The butane-butylene mixture had the following approximate composition:

| | Per cent |
|---|---|
| Normal butane | 67.0 |
| Isobutane | 9.8 |
| Alpha-butylene | 0.7 |
| Beta-butylene | 20.0 |
| Isobutylene | 0.0 |
| Propane | 2.4 |
| Propylene | 0.1 |
| | 100.0 |

The reaction was effected in a reactor consisting of three glass tubes (1.0 cm. (I. D.) ×20 cm.) connected in series. The tubes were packed with granular calcium chloride and surrounded by a constant temperature bath by means of which the temperature throughout the reaction zone was kept at a minimum of 75° C. and the presence of a liquid phase therein obviated. The gaseous butane-butylene mixture was passed into the first of the series of reaction tubes. The gaseous chlorine flow was divided into two equal parts, one part being fed into the first reaction tube while the other part was fed into the second reaction tube. The total chlorine flow was about 1.86 gm. per minute, the flow of hydrocarbon being adjusted so that the mol ratio of total hydrocarbon to chlorine fed to the reactor was about 5.3. During the operation, the temperature was maintained in the range of from 75° to 135° C. Butylene dichloride was obtained in a yield of 83.4% based on the applied chlorine. The yield of unsaturated monochloride (crotyl chloride) was about 8.0%. Thus, the yield of useful products was 91.4%. Due to operation under such conditions that no liquid phase was present in the reaction zone during execution of the chlor-addition reaction, substantially no induced chlorine substitution into the butylene dichloride or the butane took place. Analysis of the reaction product showed that it contained no more than about 0.2% of a saturated monochloride. It is seen that the method illustrated by this example provides a practical and economical method for converting the butylene content of a technical butane-butylene mixture to useful chlorinated products. The process can be executed under such conditions that substantially only butylene dichloride or any desired mixture thereof with crotyl chloride can be obtained. Such a mixture provides a suitable starting material for the production of butadiene via pyrolysis or catalytic splitting out of hydrochloric acid, prior separation of the butylene dichloride and crotyl chloride being unnecessary.

*Example V*

A butane-butylene mixture was treated with chlorine to effect the chlorination predominantly by chlor-addition of the butylene content of the mixture. The butane-butylene mixture had a composition approximately equal to the mixture used in Example IV.

The reaction was effected in a reactor consisting of three glass tubes (1.6 cm.×30.5 cm.) connected in series. The tubes were packed with about 8 to 10 mesh carbon chips. The reaction tubes were surrounded by an oil bath by means of which the temperature throughout the reaction zone was kept at a minimum of 80° C. The gaseous butane-butylene mixture and gaseous chlorine were passed through the reaction tube wherein the temperature was kept in the range of from 80° C. to 128° C. during the operation.

The chlorine flow was about 1.97 gm./min. The hydrocarbon flow was so adjusted that the total hydrocarbon to chlorine ratio was about 4.97, and the olefin to chlorine ratio about 1.10.

Butylene dichlorides were obtained in a yield of about 76.8% based on the applied chlorine. The yield of unsaturated monochlorides was about 13.0%. Thus, the yield of useful products was about 90%. The amounts of saturated monochlorides and saturated dichlorides formed were quite low, indicating substantially no induced chlorine substitution into butylene dichloride or butane.

Substantially the same results were obtained when the run was made under about the same conditions using packed metal reaction tubes of about the same dimensions.

The term "allylic chlor-substitution," as employed herein and in the appended claims, refers to a reaction in which a chlorine atom is substituted for a hydrogen atom on a carbon atom which is in allylic position with respect to the double bond. Such allylic chlor-substitution results in the production of allyl type chlorides, i. e. compounds in which the chlorine atom is linked to a carbon atom in allylic position with respect to the double bond. For instance, the allylic chlor-substitution of propylene $$(CH_3-CH=CH_2)$$

produces allyl chloride $$(CH_2Cl-CH=CH_2).$$

Similarly, the allylic chlorination via substitution of beta-butylene $(CH_3-CH=CH-CH_3)$ forms the crotyl chloride $$(CH_3-CH=CH-CH_2Cl).$$

In all such cases the chlorinated carbon atom is saturated and is once removed from the ethylenic or unsaturated bond.

The scope of the invention is to be construed in accordance with the appended claims and is not to be restricted to the particular operating conditions and manipulative procedures described herein as merely illustrative of the novel process.

We claim as our invention:

1. In a process for effecting the chlorination of ethylene to ethylene dichloride by reacting gaseous ethylene with gaseous chlorine in the substantial absence of a diluent material, the step of preventing induced chlorine substitution into ethylene dichloride present in the reaction zone by effecting the chlor-addition reaction in the initial, complete and continuous absence of a liquid phase in a reaction zone maintained throughout the reaction at a temperature in the range of from 100° C. to 200° C.

2. In a process for effecting the chlorination of ethylene to ethylene dichloride by reacting gaseous ethylene with gaseous chlorine in the substantial absence of a diluent material, the step of preventing induced chlorine substitution into ethylene dichloride present in the reaction zone by effecting the chlor-addition reaction in the initial, complete and continuous absence of a liquid phase in a reaction zone maintained throughout at a temperature not greater than about 200° C. but sufficiently high to preclude the formation of a liquid phase therein under reaction conditions.

3. In a process for effecting the chlorination of a non-tertiary olefin containing from 2 to 5 carbon atoms to the corresponding olefin dichloride by reacting the gaseous olefin with gaseous chlorine in the substantial absence of a diluent material, the step of preventing induced chlorine substitution into the olefin dichloride present in the reaction zone by effecting the chlor-addition reaction in the initial, complete and continuous absence of a liquid phase in a reaction zone maintained throughout at a minimum temperature sufficiently high to preclude the formation of a liquid phase therein but below the temperature at which substantial chlor-substitution of the olefin occurs.

4. In a process for effecting the chlorination via chlor-addition of at least a part of the butylene content of a hydrocarbon mixture consisting of substantially only butanes and secondary butylenes and containing a substantial amount of a secondary butylene by treating the gaseous hydrocarbon mixture with gaseous chlorine in the presence of a surface-active material, the step of preventing induced chlorine substitution into butylene dichlorides and butanes present in the reaction zone by effecting the chlorination at about atmospheric pressure in the initial, complete and continuous absence of a liquid phase in a reaction zone maintained throughout at a temperature of from about 75° C. to 135° C.

5. In a process for effecting the chlorination via chlor-addition of at least a part of the butylene content of a hydrocarbon mixture consisting of substantially only butanes and secondary butylenes and containing a substantial amount of a secondary butylene by treating the gaseous hydrocarbon mixture with gaseous chlorine in the presence of a surface-active material, the step of preventing induced chlorine substitution into butylene dichlorides and butanes present in the reaction zone by effecting the chlorination at about atmospheric pressure in the initial, complete and continuous absence of a liquid phase in a reaction zone maintained throughout at a minimum temperature sufficiently high to preclude the formation of a liquid phase of reaction products therein under reaction conditions but below the temperature at which substantial allylic chlor-substitution of a secondary butylene occurs.

6. In a process for effecting the chlorination via chlor-addition of at least a part of the butylene content of a hydrocarbon mixture consisting of substantially only hydrocarbons containing four carbon atoms per molecule and comprising a substantial amount of a secondary butylene by treating the gaseous hydrocarbon mixture with gaseous chlorine, the step of preventing induced chlorine substitution into saturated compounds present in the reaction zone by effecting the chlorination in the initial, complete and continuous absence of a liquid phase in a reaction zone maintained throughout at a minimum temperature sufficiently high to preclude the formation of a liquid phase therein under reaction conditions but below the temperature at which substantial allylic chlor-substitution of a secondary butylene occurs.

7. In a process for effecting the chlorination via chlor-addition of at least a part of the propylene content of a hydrocarbon mixture consisting of substantially only propane and propylene and containing a substantial amount of the latter by treating the gaseous hydrocarbon mixture with gaseous chlorine in the presence of a surface-active material, the step of avoiding induced chlorine substitution into saturated compounds present in the reaction mixture by effecting the chlorination in the initial, complete and continuous absence of a liquid phase in a reaction zone maintained throughout at a minimum temperature sufficiently high to preclude the formation of a liquid phase therein under reaction conditions but below the temperature at which substantial allylic chlor-substitution of the propylene occurs.

8. In a process for effecting the chlorination via chlor-addition of at least a part of the non-tertiary olefin content of a hydrocarbon mixture consisting of saturated hydrocarbons containing at least three carbon atoms per molecule and olefins containing from 2 to 5 carbon atoms and comprising a substantial amount of at least one non-tertiary olefin by treating the gaseous hydrocarbon mixture with gaseous chlorine, the step of preventing induced chlorine substitution into saturated compounds present in the reaction zone by effecting the chlorination in the initial, complete and continuous absence of a liquid phase in a reaction zone maintained throughout at a temperature sufficiently high to preclude the formation of a liquid phase therein under reaction conditions but below the temperature at which chlor-substitution of a non-tertiary olefin is the predominant reaction.

9. In a process for effecting the chlorination via chlor-addition of at least a part of the non-tertiary olefin content of a hydrocarbon mixture whose lowest saturated chlorinated products normally boil above room temperature and which contains a substantial amount of at least one non-tertiary olefin containing from 2 to 5 carbon atoms per molecule by treating the gaseous hydrocarbon mixture with gaseous chlorine, the step of preventing induced chlorine substitution into saturated compounds present in the reaction zone by effecting the chlorination in the initial, complete and continuous absence of a liquid phase in a reaction zone maintained throughout at a temperature above the dew point, under the reaction conditions, of all saturated compounds present therein but below the temperature at which chlor-substitution of a non-tertiary olefin containing from 2 to 5 carbon atoms is the predominant reaction.

10. In a process for effecting the chlorination of a non-tertiary olefin containing from 2 to 5 carbon atoms to the corresponding olefin dichloride by reacting a hydrocarbon predominating in said gaseous olefin with gaseous chlorine, the step of preventing induced chlorine substitution into the olefin dichloride present in the reaction zone by effecting the chlor-addition reaction in the initial, complete and continuous absence of a liquid phase in a reaction zone maintained throughout at a minimum temperature sufficiently high to preclude the formation of a liquid phase therein but below the temperature at which substantial chlor-substitution of the olefin occurs.

HERBERT P. A. GROLL.
GEORGE HEARNE.
DONALD S. LA FRANCE.